US012123570B2

(12) United States Patent
Chiang

(10) Patent No.: US 12,123,570 B2
(45) Date of Patent: Oct. 22, 2024

(54) STREET EQUIPMENT ASSEMBLY

(71) Applicant: Agileiots Investment Co., Ltd., Taoyuan (TW)

(72) Inventor: Hung-Hsiang Chiang, Kaohsiung (TW)

(73) Assignee: AGILEIOTS INVESTMENT CO., LTD., Taoyuan (TW)

( * ) Notice: Subject to any disclaimer, the term of this patent is extended or adjusted under 35 U.S.C. 154(b) by 95 days.

(21) Appl. No.: 17/943,784

(22) Filed: Sep. 13, 2022

(65) Prior Publication Data

US 2023/0077755 A1 Mar. 16, 2023

(30) Foreign Application Priority Data

Sep. 13, 2021 (TW) ................................ 110134105

(51) Int. Cl.

*F21S 8/08* (2006.01)
*F21V 23/00* (2015.01)
*F21V 31/00* (2006.01)

(52) U.S. Cl.

CPC ............ *F21S 8/085* (2013.01); *F21V 31/005* (2013.01); *F21V 23/001* (2013.01)

(58) Field of Classification Search

CPC . F21S 8/085; F21S 8/086; F21S 8/088; F21V 23/001; F21V 15/01

See application file for complete search history.

(56) References Cited

U.S. PATENT DOCUMENTS 4,658,339 A * 4/1987 Tammerijn .............. F21V 15/01 362/373
7,219,873 B2 * 5/2007 Harwood ............ E04H 12/2261 181/171
7,361,039 B2 * 4/2008 Koehler ............... H01R 13/629 439/910
7,790,995 B2 * 9/2010 Burkett .............. H01R 13/6683 200/300
8,558,413 B1 * 10/2013 Lepard ................... H05B 47/18 307/157
10,028,355 B1 * 7/2018 Hancock ............. F21V 23/0464
2013/0142372 A1 * 6/2013 Harwood ............... H04R 1/028 381/334
2017/0122546 A1 * 5/2017 Abbott .................... F21S 9/035
2018/0098379 A1 * 4/2018 Chiang .................. H05B 47/19
2020/0056753 A1 * 2/2020 Chiang ................... F21S 8/086
(Continued)

*Primary Examiner* — Peggy A Neils
*Assistant Examiner* — James M Endo
(74) *Attorney, Agent, or Firm* — Chun-Ming Shih; LANWAY IPR SERVICES

(57) ABSTRACT

A street equipment assembly including a base and a plurality of poles. The poles can accommodate external devices, and the base is for receiving internal devices. The street equipment assembly allows sufficient electronic equipment to be installed on limited areas of roads, thereby in line with the needs of electronic equipment for smart urban development. The street equipment assembly in the present invention includes a connection pipe for guiding and connecting lines of the external and internal devices to the base. The connection pipe is further extended upwards to have its opening reach above top of the base to form a chimney structure. The chimney structure can prevent any liquid at the top of the base from entering the base through the opening of the connection pipe and can dissipate heat out of the base.

20 Claims, 6 Drawing Sheets

(56) References Cited

U.S. PATENT DOCUMENTS

| | | | | |
|---|---|---|---|---|
| 2020/0080696 | A1* | 3/2020 | Ducros | F21S 8/086 |
| 2020/0190842 | A1* | 6/2020 | Ducros | H02G 3/083 |
| 2020/0191346 | A1* | 6/2020 | Lockwood | E04H 12/00 |
| 2020/0218022 | A1* | 7/2020 | Erasmus | G02B 6/50 |
| 2020/0278096 | A1* | 9/2020 | Pereira | F21S 8/085 |
| 2020/0355335 | A1* | 11/2020 | Weber | F21V 23/007 |
| 2021/0320393 | A1* | 10/2021 | Williams | E04H 12/24 |
| 2021/0396365 | A1* | 12/2021 | Friederichs | H02G 3/0406 |
| 2022/0015261 | A1* | 1/2022 | Harwood | F21V 21/10 |
| 2022/0223993 | A1* | 7/2022 | Gienger | F21V 23/02 |

* cited by examiner

STREET EQUIPMENT ASSEMBLY

CROSS-REFERENCE TO RELATED APPLICATIONS

This application claims the priority of Republic of China Patent Application No. 110134105 filed on Sep. 13, 2021, in the State Intellectual Property Office of the R.O.C., the disclosure of which is incorporated herein by reference.

BACKGROUND OF THE INVENTION

Field of the Invention

The present invention relates to a street equipment assembly for accommodating a plurality of devices and including an internal connection pipe for waterproof and heat dissipation purposes.

Descriptions of the Related Art

Smart urban development has unavoidably become important in future urban planning. As roads are essential infrastructures in a city for vehicles and pedestrians to use, they cover a large portion of the city and are distributed evenly. It is then reasonable that electronic equipment required for smart urban development would be provided along the roads. Practically, however, there are very limited areas of the roads capable of accommodating the electronic equipment while considering traffic safety, cityscape and right of way. Therefore, how to install sufficient electronic equipment on the limited areas of the roads to provide adequate hardware facilities for smart urban development, is an important task in the art.

SUMMARY OF THE INVENTION

Given the shortcomings of the above-mentioned prior art, the present invention provides a street equipment assembly for accommodating at least one internal street light device, at least one external street light device, at least one internal network device and at least one external network device, the street equipment assembly including: a base having a base internal chamber for receiving the internal street light device and the internal network device; a first pole including a first pole internal space, and connected to the base and extended upwards to allow the external street light device to be mounted at a first position; a second pole including a second pole internal space, and connected to the base and extended upwards to allow the external network device to be mounted at a second position, wherein the second position is substantially different from the first position; a connection pipe including a pipe internal space that is located at top of the base and communicates with the base internal chamber, wherein the connection pipe is extended upwards to have its opening situated above the top of the base to prevent any liquid at the top of the base from entering the base internal chamber through the opening of the connection pipe; at least one street light device main line for connecting the internal street light device to the external street light device through the pipe internal space and the first pole internal space and for transmitting a street light device signal for the internal street light device and the external street light device; and at least one network device main line for connecting the internal network device to the external network device through the pipe internal space and the second pole internal space and for transmitting a network device signal for the internal network device and the external network device.

Preferably, the street equipment assembly of the above-mentioned, wherein the first pole and the second pole are extended upwards and cross at a crossing position where the first pole and the second pole support each other to form a structural reinforcement.

Preferably, the street light equipment of the above-mentioned, wherein the first pole internal space communicates with the second pole internal space at the crossing position, and the street equipment assembly further includes a street light device secondary line that goes through the crossing position, the pipe internal space and the second pole internal space to connect the internal street light device to the external street light device so as to form a backup transmission line for the street light device signal.

Preferably, the street light equipment of the above-mentioned, wherein the first pole internal space communicates with the second pole internal space at the crossing position, and the street equipment assembly further includes a network device secondary line that goes through the crossing position, the pipe internal space and the first pole internal space to connect the internal network device to the external network device so as to form a backup transmission line for the network device signal.

Preferably, the street light equipment of the above-mentioned, wherein the base further includes a reel on which the street light device main line or the network device main line is wound, so as to allow the street light device main line or the network device main line to extend along a predetermined route in the base internal chamber.

Preferably, the street light equipment of the above-mentioned, wherein the base further includes a rack having a rack end positioning structure, and each of the internal street light device and the internal network device has a device end positioning structure, wherein the device end positioning structure matches the rack end positioning structure to allow the internal street light device and the internal network device to be positioned on the rack.

Preferably, the street light equipment of the above-mentioned, wherein the base further includes a base body and a hatch, with the base internal chamber being formed in the base body, wherein the hatch is made to be away from or abut the base body to open or close the base internal chamber.

Preferably, the street light equipment of the above-mentioned, wherein the base further includes a waterproof pad for sealing a gap between the hatch and the base body to provide a waterproof effect when the hatch abuts the base body.

Preferably, the street light equipment of the above-mentioned, wherein the base further includes a deflector plate for guiding the liquid to flow away from the top of the base.

Preferably, the street light equipment of the above-mentioned, wherein the base further includes a deflector tube for guiding the liquid to flow away from the top of the base.

Preferably, the street light equipment of the above-mentioned, wherein the at least one network device main line includes a plurality of network device main lines, the at least one internal network device includes a plurality of internal network devices, the at least one external network device includes a plurality of external network devices, and the street equipment assembly further includes an internal network device jumper and an external network device jumper, wherein the internal network device jumper is located near the plurality of internal network devices and provides jump contacts for the plurality of network device main lines to allow each of the network device main lines to be connected to a predetermined one of the plurality of internal network devices, and the external network device jumper is located near the plurality of external network devices and provides jump contacts for the plurality of network device main lines to allow each of the network device main lines to be connected to a predetermined one of the plurality of external network devices.

Preferably, the street light equipment of the above-mentioned, wherein the plurality of network device main lines are integrated into a main cable structure.

Preferably, the street light equipment of the above-mentioned, wherein the second pole further includes an internal network device side maintenance hole formed at a position near the internal network device, for exposing a nearby part of the pipe internal space to allow the internal network device to undergo maintenance; and the second pole further includes an external network device side maintenance hole formed at a position near the external network device, for exposing a nearby part of the second pole internal space to allow the external network device to undergo maintenance.

Compared to prior arts, the present invention is to provide a street equipment assembly including a base and a plurality of poles. The poles can accommodate external devices, and the base is for receiving internal devices. The street equipment assembly allows sufficient electronic equipment to be installed on limited areas of roads, thereby in line with the needs of electronic equipment for smart urban development.

Moreover, the street equipment assembly in the present invention includes a connection pipe for guiding and connecting lines of the external and internal devices to the base. The connection pipe is further extended upwards to have its opening reach above top of the base to form a chimney structure. The chimney structure can prevent any liquid at the top of the base from entering the base through the opening of the connection pipe and can dissipate heat out of the base.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
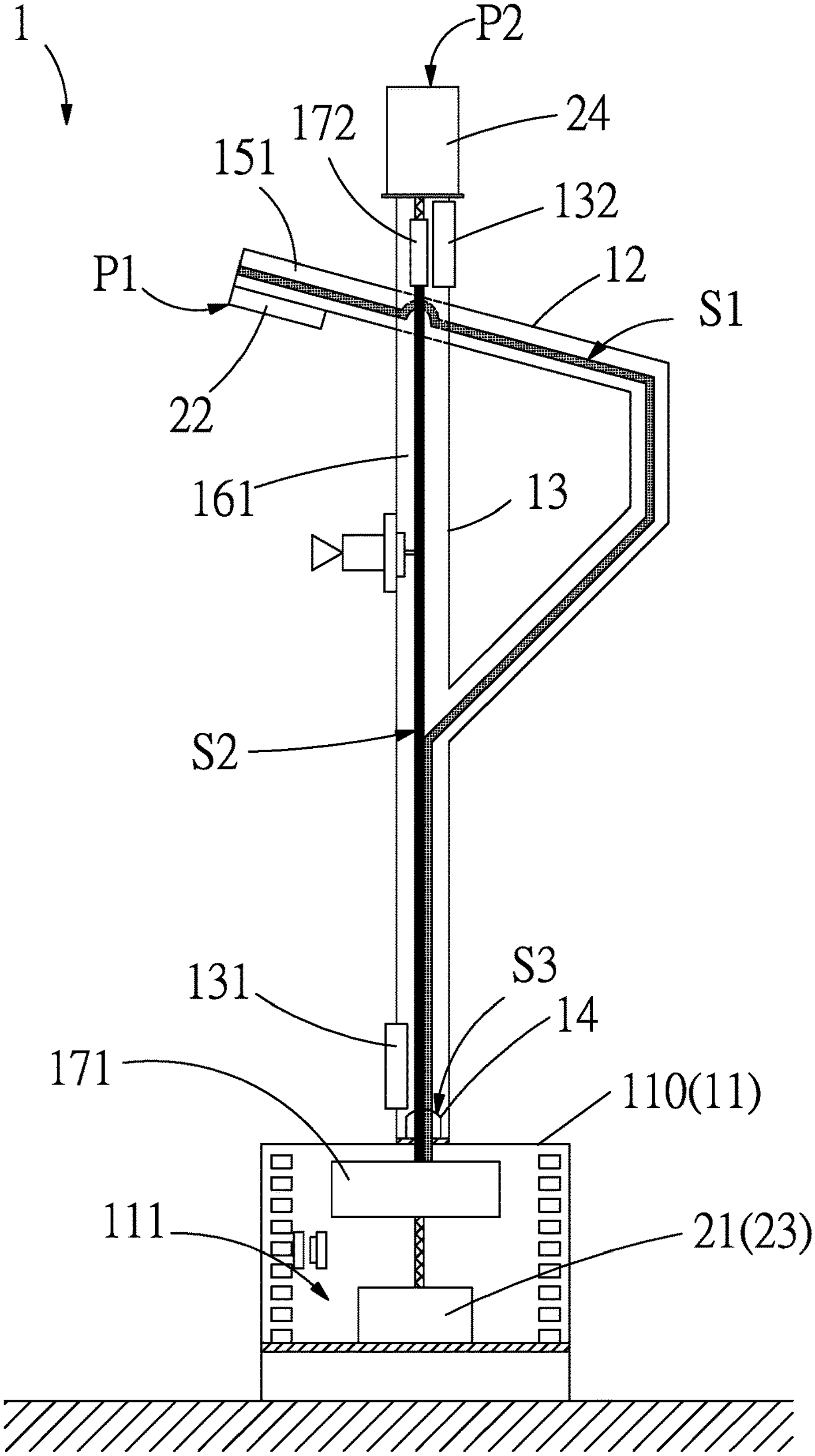
FIGS. 1 and 2 are schematic diagrams showing embodiments of a street equipment assembly according to the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Technical features of a street equipment assembly according to the present invention are described with reference to FIGS. 1 to 6 and the following embodiments.

In the drawings, the shapes and dimensions of elements may be exaggerated for clarity, and the same reference numerals will be used throughout to designate the same or like components.

Figure 2:
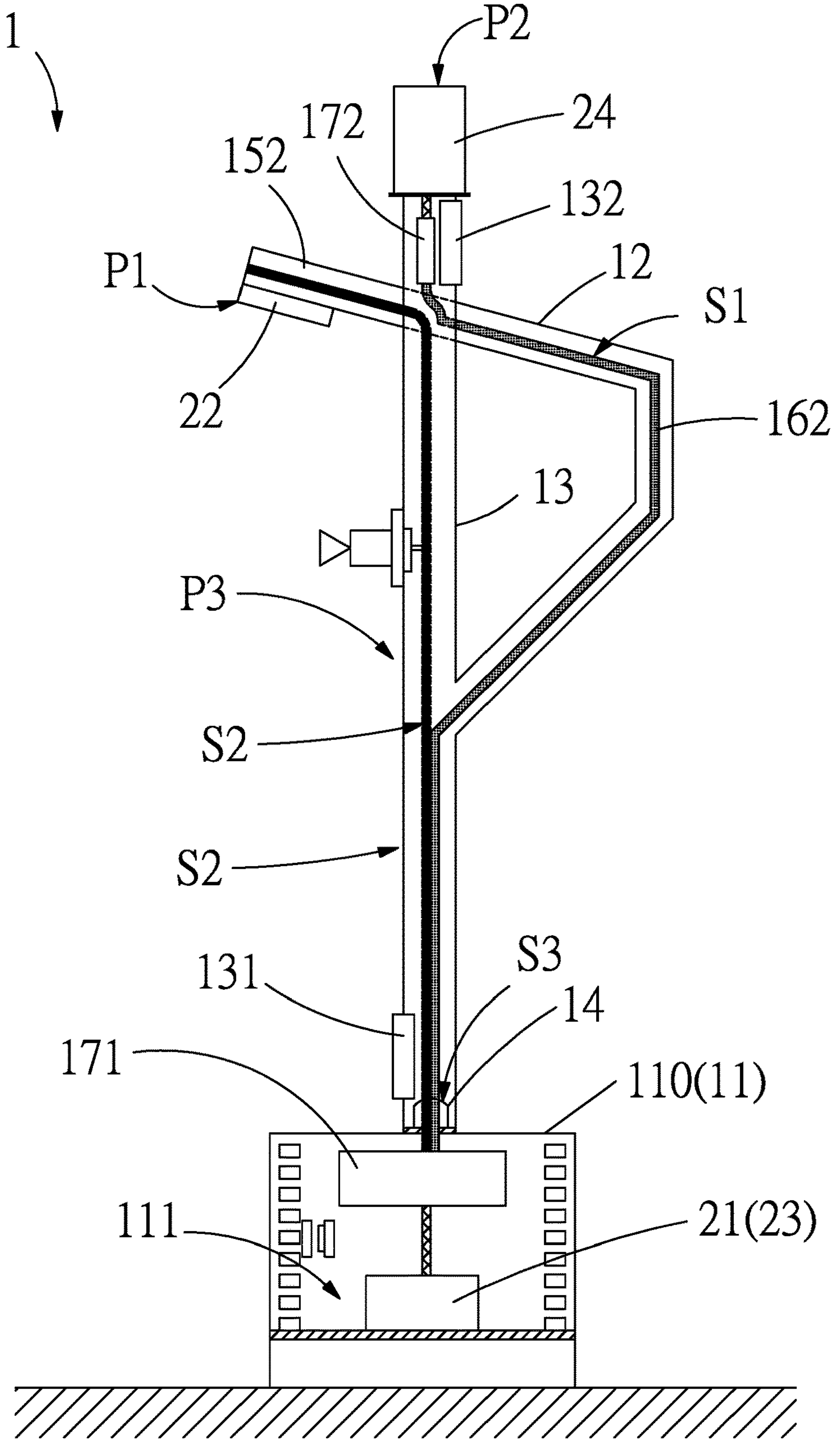

In the embodiments shown in FIGS. 1 to 2, the street equipment assembly 1 is used to accommodate one or more of the following devices: internal street light device 21, external street light device 22, internal network device 23 and external network device 24. The street equipment assembly 1 includes a base 11, a first pole 12, a second pole 13, a connection pipe 14, a street light device main line 151 and a network device main line 161.

Figure 4:
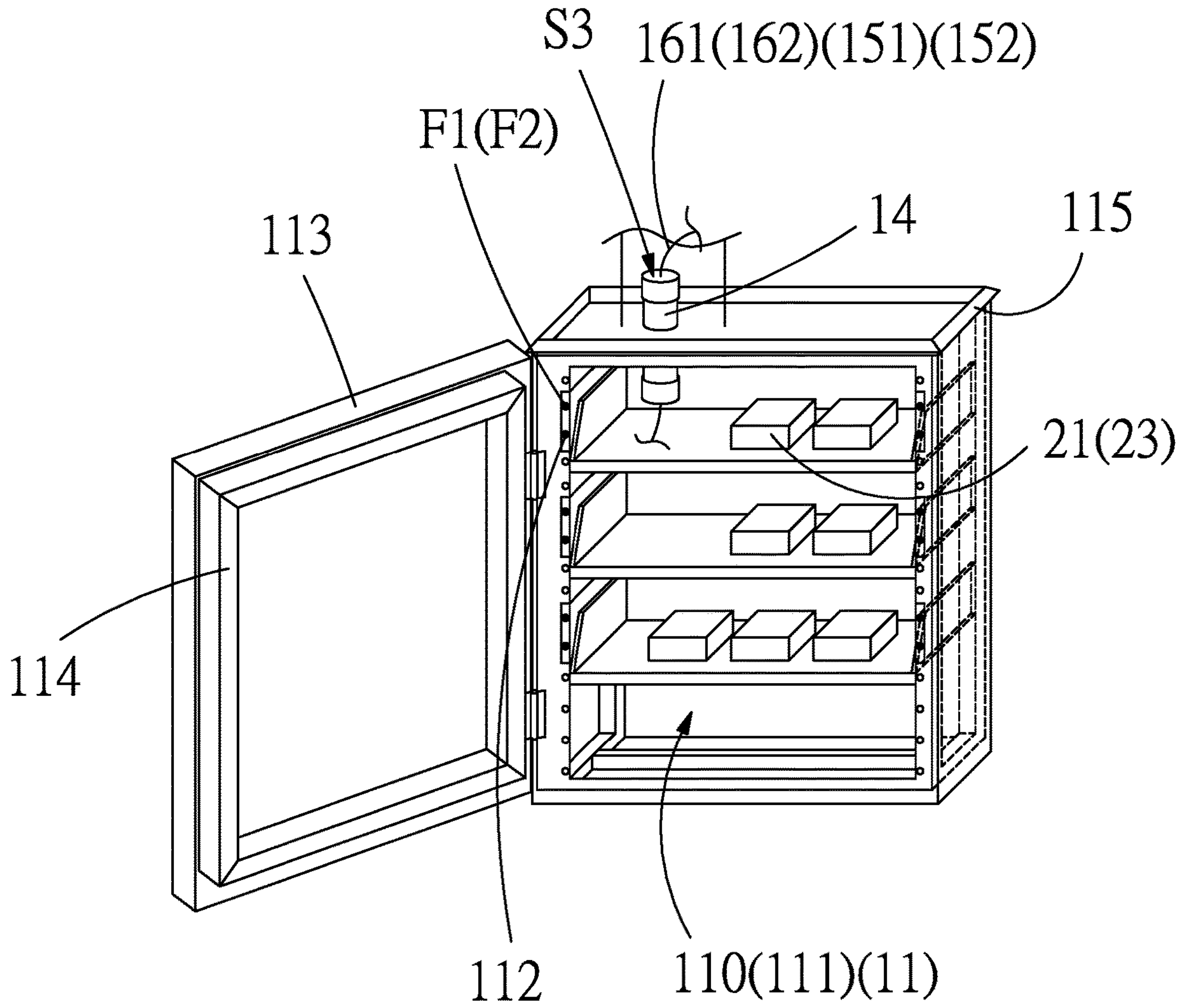
FIGS. 4, 5 and 6 are schematic diagrams showing embodiments of a base of the street equipment assembly.
Figure 5:
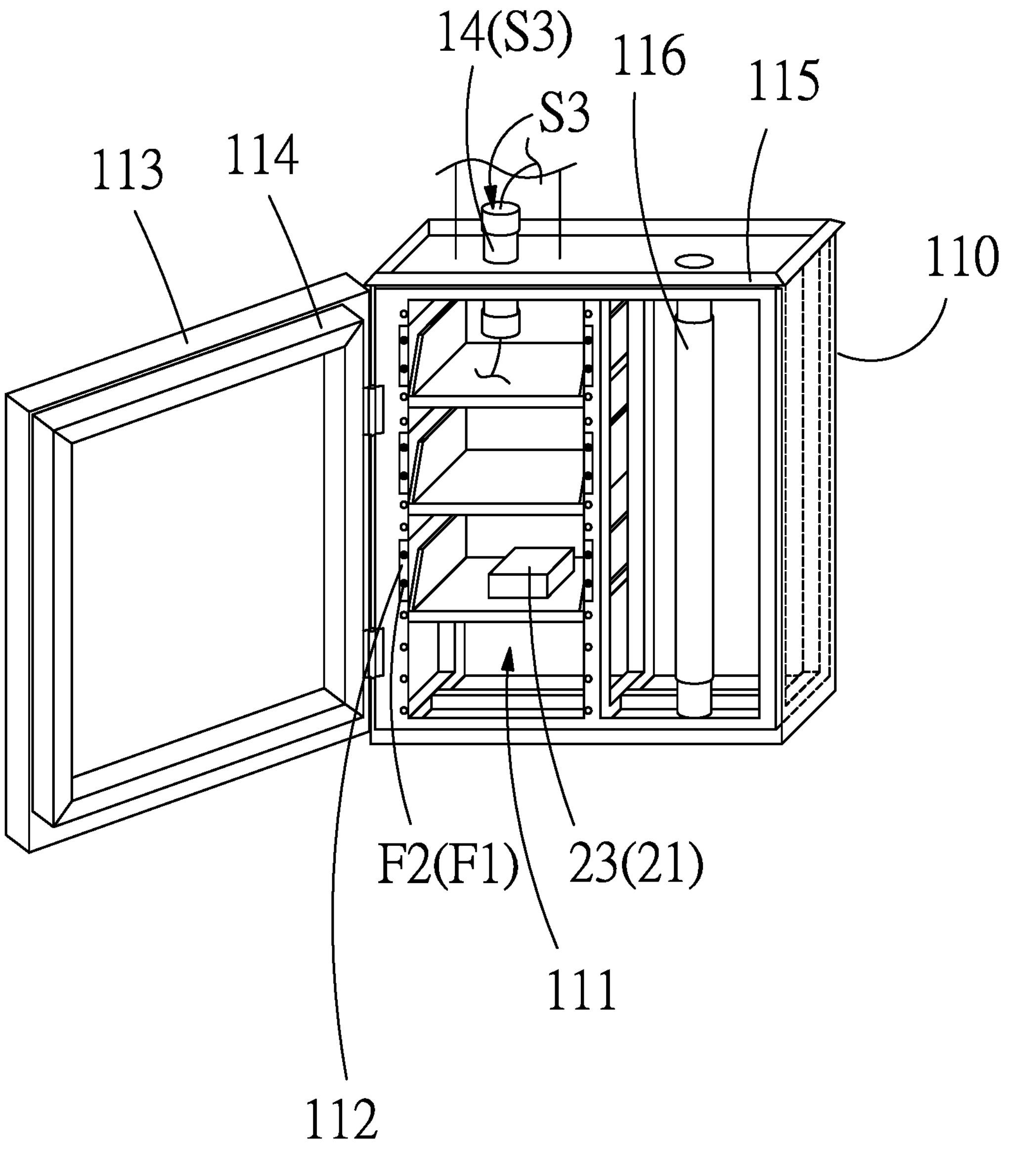
Figure 6:
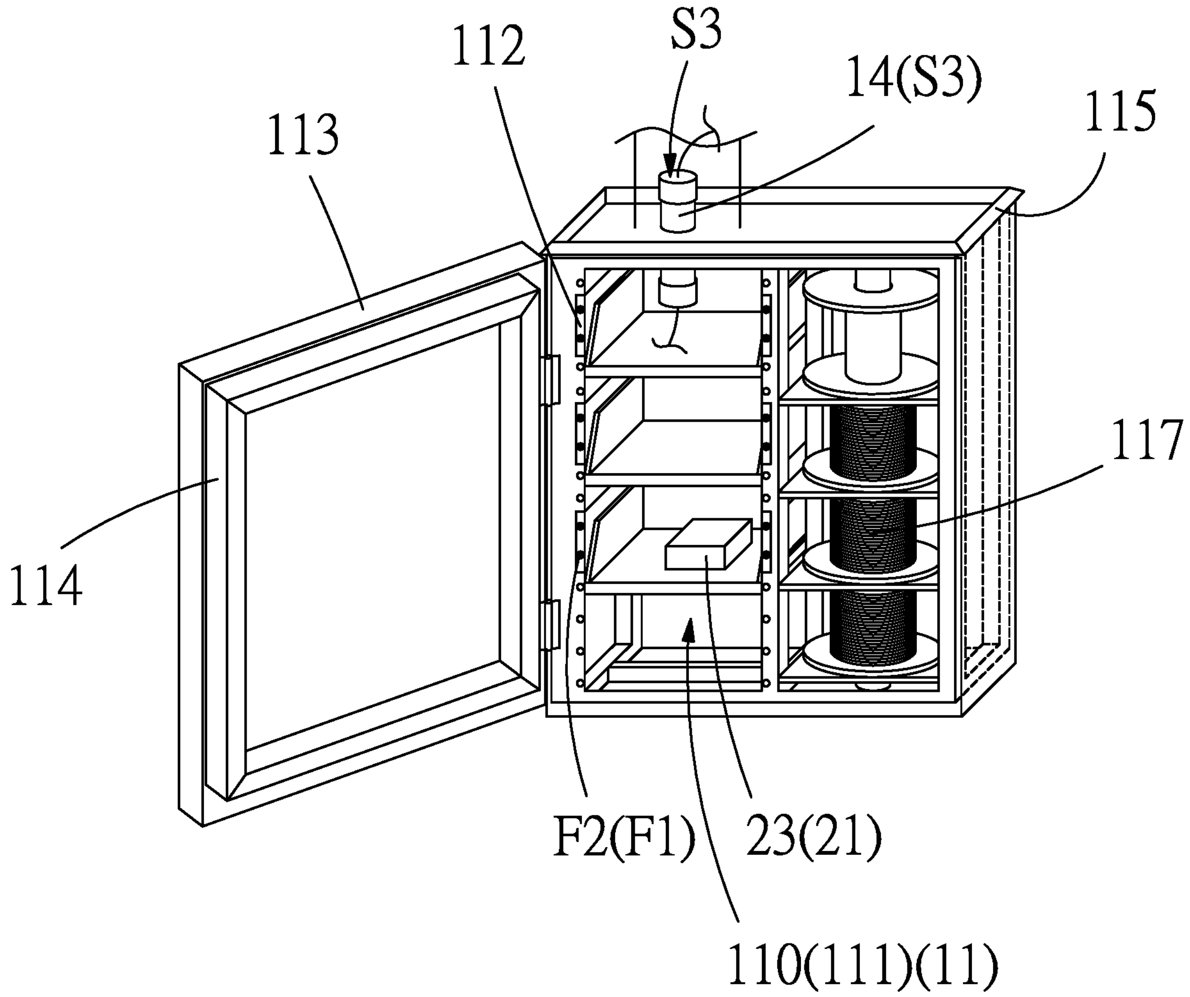

The base 11 is formed with a base internal chamber 111 for receiving the internal street light device 21 and the internal network device 23. As shown in FIGS. 4 to 6, the base 11 includes a rack 112 having a rack end positioning structure F1, and correspondingly the internal street light device 21 and the internal network device 23 are respectively formed with a device end positioning structure F2 that can match the rack end positioning structure F1 to allow the internal street light device 21 and the internal network device 23 to be positioned on the rack 112. It should be noted that, the device end positioning structure F2 and the rack end positioning structure F1 are flexibly designed according to device sizes so as to allow the internal street light device 21 and the internal network device 23 to be easily positioned on the rack 112.

Moreover, as there might be liquid at top of the base 11, a deflector plate 115 and a deflector tube 116 are further provided in the base 11 as shown in FIG. 5, and are used to guide the liquid to flow away from the base 11. The deflector plate and the deflector tube are not the only option. The base 11 can alternatively use other draining structures to replace the deflector plate 115 and the deflector tube 116.

The first pole 12 is formed with a first pole internal space S1, and is connected to the base 11 and extended upwards to allow the external street light device 22 to be mounted at a first position P1 where the external street light device 22 can provide elevated lighting. The second pole 13 is formed with a second pole internal space S2, and is connected to the base 11 and extended upwards to allow the external network device 24 to be mounted at a second position P2 where the external network device 24 can provide network signal processing at an elevated location. The positions P1 and P2 are substantially different from each other, such that the external street light device 22 is separate from the external network device 24 without causing any interference to each other, thereby complying with regulations for setting the external street light device 22 and the external network device 24.

The connection pipe 14 is formed with a pipe internal space S3 that is situated at the top of the base 11 and communicates with the base internal chamber 111. As shown in FIG. 1, the street light device main line 151 connects the internal street light device 21 to the external street light device 22 through the pipe internal space S3 and the first pole internal space S1, and is used to transmit street light device signals for the internal street light device 21 and the external street light device 22 to make the internal street light device 21 and the external street light device 22 able to operate normally. The network device main line 161 connects the internal network device 23 to the external network device 24 through the pipe internal space S3 and the second pole internal space S2, and is used to transmit network device signals for the internal network device 23 and the external network device 24 to make the internal network device 23 and the external network device 24 able to operate normally.

As shown in FIGS. 1 to 2, the second pole 13 includes an internal network device side maintenance hole 131 and an external network device side maintenance hole 132. The internal network device side maintenance hole 131 is formed on the second pole 13 at a position near the internal network device 23, and exposes a nearby part of the pipe internal space S3 where the internal network device 23 can undergo maintenance. The external network device side maintenance hole 132 is formed on the second pole 13 at a position near the external network device 24, and exposes a nearby part of the second pole internal space S2 where the external network device 24 can undergo maintenance.

It should be noted that, the street equipment assembly 1 may accommodate a plurality of internal network devices 23 and a plurality of external network devices 24, and accordingly can include a plurality of network device main lines 161, an internal network device jumper 171 and an external network device jumper 172. As shown in FIGS. 1 to 2, the plurality of network device main lines 161 can be integrated into a main cable structure. The internal network device jumper 171 is located near the plurality of internal network devices 23, and provides jump contacts for the plurality of network device main lines 161 to allow each of the network device main lines 161 to be connected to a predetermined one of the plurality of internal network devices 23. The external network device jumper 172 is located near the plurality of external network devices 24, and provides jump contacts for the plurality of network device main lines 161 to allow each of the network device main lines 161 to be connected to a predetermined one of the plurality of external network devices 24.

In the embodiment as shown in FIG. 6, the base 11 includes a reel 117 on which the street light device main line 151 or the network device main line 161 can be wound, such that the street light device main line 151 or the network device main line 161 is neatly received in the base internal chamber 111 and can extend along a predetermined route to be connected to the internal street light device 21 or the internal network device 23, without making the street light device main line 151 or the network device main line 161 break or damage during extension.

In the embodiment as shown in FIG. 4, the connection pipe 14 is extended upwards to have its opening situated above the top of the base 11 to form a chimney structure. The chimney structure prevents any liquid at the top of the base 11 form entering the base internal chamber 111 through the opening of the connection pipe 14, without having to seal the base internal chamber 111, and provides a dry environment where the internal street light device 21 and the internal network device 23 can operate with suffering no adverse effect from the liquid. The chimney structure of the connection pipe 14 can also be used to dissipate heat from the internal street light device 21 and the internal network device 23 when they are operating in the base internal chamber 111.

In the embodiment as shown in FIGS. 4 to 6, the base 11 further includes a base body 110, a hatch 113 and a waterproof pad 114. The base internal chamber 111 is formed in the base body 110. The hatch 113 can be made to be away from or abut the base body 110 to open or close up the base internal chamber 111. When the hatch 113 abuts the base body 110, the waterproof pad 114 seals a gap between the hatch 113 and the base body 110 to provide a waterproof effect.

Figure 3:
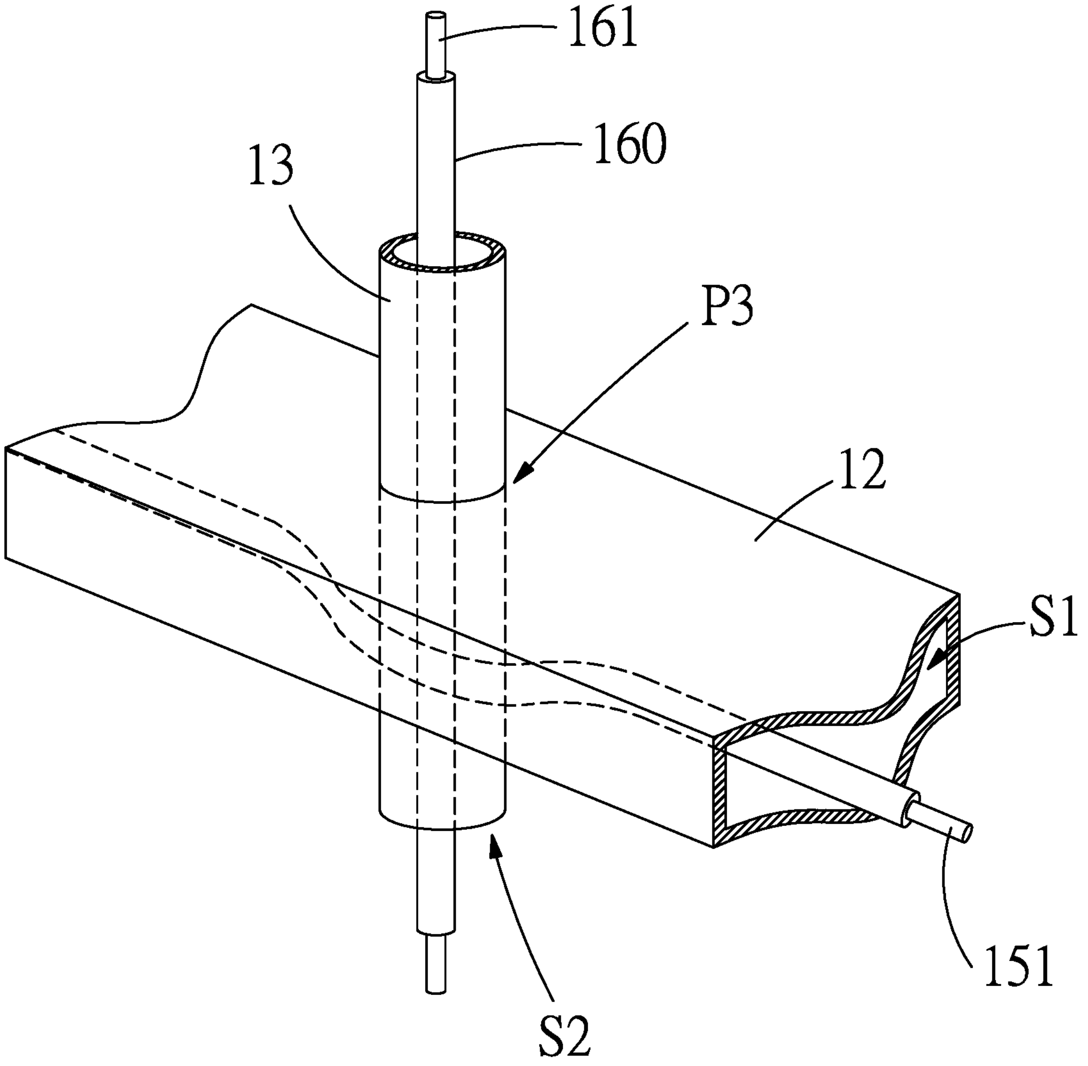
FIG. 3 is a schematic diagram showing crossing of a plurality of poles of the street equipment assembly.

In the embodiment as shown in FIG. 3, the first pole 12 and the second pole 13 have different shapes, and are extended upwards to cross at a crossing position P3 where the first pole 12 and the second pole 13 are interconnected and structurally support each other, such that crossing of the first pole 12 and the second pole 13 produces a structural reinforcement.

In the embodiment as shown in FIG. 2, the street equipment assembly 1 further includes a street light device secondary line 152 and a network device secondary line 162 to serve as backup transmission lines. The first pole internal space S1 communicates with the second pole internal space S2 at the crossing position P3. The street light device secondary line 152 goes through the crossing position P3, the pipe internal space S3 and the second pole internal space S2 to connect the internal street light device 21 to the external street light device 22, so as to form the backup transmission line for street light device signals. If the street light device main line 151 does not function properly, the street light signals can be transmitted by the street light device secondary line 152 to the internal street light device 21 and the external street light device 22. The network device secondary line 162 goes through the crossing position P3, the pipe internal space S3 and the first pole internal space S1 to connect the internal network device 23 to the external network device 24, so as to form the backup transmission line for network device signals. If the network device main line 161 does not function properly, the network device signals can be transmitted by the network device secondary line 162 to the internal network device 23 and the external network device 24.

In the embodiment as shown in FIGS. 1 to 2, the street light device main line 151 and the street light device secondary line 152 are respectively extended in the first pole internal space and the second pole internal space S2 and are thus separate to allow individual inspection and maintenance. The network device main line 161 and the network device secondary line 162 are respectively extended in the second pole internal space S2 and the first pole internal space S1 and are thus separate to allow individual inspection and maintenance.

Given the above, the present invention proposes a street equipment assembly including a base and a plurality of poles. The poles can accommodate external devices, and the base is for receiving internal devices. The street equipment assembly allows sufficient electronic equipment to be installed on limited areas of roads, thereby in line with the needs of electronic equipment for smart urban development.

Moreover, the street equipment assembly in the present invention includes a connection pipe for guiding and connecting lines of the external and internal devices to the base. The connection pipe is further extended upwards to have its opening reach above top of the base to form a chimney structure. The chimney structure can prevent any liquid at the top of the base from entering the base through the opening of the connection pipe and can dissipate heat out of the base.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A street equipment assembly for accommodating at least one internal street light device, at least one external street light device, at least one internal network device and at least one external network device, the street equipment assembly comprising:

a base having a base internal chamber for receiving the at least one internal street light device and the at least one internal network device;

a first pole including a first pole internal space, and connected to the base and extended upwards to allow the at least one external street light device to be mounted at a first position;

a second pole including a second pole internal space, and connected to the base and extended upwards to allow the at least one external network device to be mounted at a second position, wherein the second position is substantially different from the first position;

a connection pipe including a pipe internal space that is located at top of the base and communicates with the base internal chamber, wherein the connection pipe is extended upwards to have its opening situated above the top of the base to prevent any liquid at the top of the base from entering the base internal chamber through the opening of the connection pipe;

at least one street light device main line for connecting the at least one internal street light device to the at least one external street light device through the pipe internal space and the first pole internal space and for transmitting a street light device signal for the at least one internal street light device and the at least one external street light device; and at least one network device main line for connecting the at least one internal network device to the at least one external network device through the pipe internal space and the second pole internal space and for transmitting a network device signal for the at least one internal network device and the at least one external network device, wherein the first pole and the second pole are extended upwards and cross at a crossing position where the first pole and the second pole support each other to form a structural reinforcement;

wherein the first pole internal space communicates with the second pole internal space at the crossing position, and the street equipment assembly further includes a street light device secondary line that goes through the crossing position, the pipe internal space and the second pole internal space to connect the at least one internal street light device to the at least one external street light device so as to form a backup transmission line for the street light device signal.

2. The street equipment assembly according to claim 1, wherein the base further includes a reel on which the at least one street light device main line or the network device main line is wound, so as to allow the at least one street light device main line or the network device main line to extend along a predetermined route in the base internal chamber.

3. The street equipment assembly according to claim 1, wherein the base further includes a rack having a rack end positioning structure, and each of the at least one internal street light device and the at least one internal network device has a device end positioning structure, wherein the device end positioning structure matches the rack end positioning structure to allow the at least one internal street light device and the at least one internal network device to be positioned on the rack.

4. The street equipment assembly according to claim 1, wherein the base further includes a base body and a hatch, with the base internal chamber being formed in the base body, wherein the hatch is made to be away from or abut the base body to open or close the base internal chamber.

5. The street equipment assembly according to claim 4, wherein the base further includes a waterproof pad for sealing a gap between the hatch and the base body to provide a waterproof effect when the hatch abuts the base body.

6. The street equipment assembly according to claim 1, wherein the base further includes a deflector plate for guiding the liquid to flow away from the top of the base.

7. The street equipment assembly according to claim 1, wherein the base further includes a deflector tube for guiding the liquid to flow away from the top of the base.

8. The street equipment assembly according to claim 1, wherein the at least one network device main line includes a plurality of network device main lines, the at least one internal network device includes a plurality of internal network devices, the at least one external network device includes a plurality of external network devices, and the street equipment assembly further includes an internal network device jumper and an external network device jumper, wherein the internal network device jumper is located near the plurality of internal network devices and provides jump contacts for the plurality of network device main lines to allow each of the network device main lines to be connected to a predetermined one of the plurality of internal network devices, and the external network device jumper is located near the plurality of external network devices and provides jump contacts for the plurality of network device main lines to allow each of the network device main lines to be connected to a predetermined one of the plurality of external network devices.

9. The street equipment assembly according to claim 8, wherein the plurality of network device main lines are integrated into a main cable structure.

10. The street equipment assembly according to claim 1, wherein the second pole further includes an internal network device side maintenance hole formed at a position near the at least one internal network device, for exposing a nearby part of the pipe internal space to allow the at least one internal network device to undergo maintenance; and the second pole further includes an external network device side maintenance hole formed at a position near the external network device, for exposing a nearby part of the second pole internal space to allow the at least one external network device to undergo maintenance.

11. A street equipment assembly for accommodating at least one internal street light device, at least one external street light device, at least one internal network device and at least one external network device, the street equipment assembly comprising:

a base having a base internal chamber for receiving the at least one internal street light device and the at least one internal network device;

a first pole including a first pole internal space, and connected to the base and extended upwards to allow the at least one external street light device to be mounted at a first position;

a second pole including a second pole internal space, and connected to the base and extended upwards to allow the at least one external network device to be mounted at a second position, wherein the second position is substantially different from the first position;

a connection pipe including a pipe internal space that is located at top of the base and communicates with the base internal chamber, wherein the connection pipe is extended upwards to have its opening situated above the top of the base to prevent any liquid at the top of the base from entering the base internal chamber through the opening of the connection pipe;

at least one street light device main line for connecting the at least one internal street light device to the at least one external street light device through the pipe internal space and the first pole internal space and for transmitting a street light device signal for the at least one internal street light device and the at least one external street light device; and at least one network device main line for connecting the at least one internal network device to the at least one external network device through the pipe internal space and the second pole internal space and for transmitting a network device signal for the at least one internal network device and the at least one external network device, wherein the first pole and the second pole are extended upwards and cross at a crossing position where the first pole and the second pole support each other to form a structural reinforcement;

wherein the first pole internal space communicates with the second pole internal space at the crossing position, and the street equipment assembly further includes a network device secondary line that goes through the crossing position, the pipe internal space and the first pole internal space to connect the at least one internal network device to the at least one external network device so as to form a backup transmission line for the network device signal.

12. The street equipment assembly according to claim 11, wherein the base further includes a reel on which the at least one street light device main line or the network device main line is wound, so as to allow the at least one street light device main line or the network device main line to extend along a predetermined route in the base internal chamber.

13. The street equipment assembly according to claim 11, wherein the base further includes a rack having a rack end positioning structure, and each of the at least one internal street light device and the at least one internal network device has a device end positioning structure, wherein the device end positioning structure matches the rack end positioning structure to allow the at least one internal street light device and the at least one internal network device to be positioned on the rack.

14. The street equipment assembly according to claim 11, wherein the base further includes a base body and a hatch, with the base internal chamber being formed in the base body, wherein the hatch is made to be away from or abut the base body to open or close the base internal chamber.

15. The street equipment assembly according to claim 14, wherein the base further includes a waterproof pad for sealing a gap between the hatch and the base body to provide a waterproof effect when the hatch abuts the base body.

16. The street equipment assembly according to claim 11, wherein the base further includes a deflector plate for guiding the liquid to flow away from the top of the base.

17. The street equipment assembly according to claim 11, wherein the base further includes a deflector tube for guiding the liquid to flow away from the top of the base.

18. The street equipment assembly according to claim 11, wherein the at least one network device main line includes a plurality of network device main lines, the at least one internal network device includes a plurality of internal network devices, the at least one external network device includes a plurality of external network devices, and the street equipment assembly further includes an internal network device jumper and an external network device jumper, wherein the internal network device jumper is located near the plurality of internal network devices and provides jump contacts for the plurality of network device main lines to allow each of the network device main lines to be connected to a predetermined one of the plurality of internal network devices, and the external network device jumper is located near the plurality of external network devices and provides jump contacts for the plurality of network device main lines to allow each of the network device main lines to be connected to a predetermined one of the plurality of external network devices.

19. The street equipment assembly according to claim 11, wherein the plurality of network device main lines are integrated into a main cable structure.

20. The street equipment assembly according to claim 11, wherein the second pole further includes an internal network device side maintenance hole formed at a position near the at least one internal network device, for exposing a nearby part of the pipe internal space to allow the at least one internal network device to undergo maintenance; and the second pole further includes an external network device side maintenance hole formed at a position near the external network device, for exposing a nearby part of the second pole internal space to allow the at least one external network device to undergo maintenance.

* * * * *